(12) United States Patent
Walton et al.

(10) Patent No.: US 11,046,435 B2
(45) Date of Patent: Jun. 29, 2021

(54) KEEP-OUT ASSEMBLY FOR AN OVERHEAD STOWAGE BIN ASSEMBLY AND METHOD OF CLOSING OUT A MAINTENANCE AREA ABOVE A STOWAGE BIN ASSEMBLY

(71) Applicant: THE BOEING COMPANY, Chicago, IL (US)

(72) Inventors: Brent Clarence Walton, Renton, WA (US); Derek Andrew Minyard, Eugene, OR (US)

(73) Assignee: THE BOEING COMPANY, Chicago, IL (US)

( * ) Notice: Subject to any disclaimer, the term of this patent is extended or adjusted under 35 U.S.C. 154(b) by 398 days.

(21) Appl. No.: 16/111,426

(22) Filed: Aug. 24, 2018

(65) Prior Publication Data

US 2020/0062401 A1   Feb. 27, 2020

(51) Int. Cl.
*B64D 11/00* (2006.01)
*F21V 17/06* (2006.01)
*B64F 5/40* (2017.01)

(52) U.S. Cl.
CPC ............ *B64D 11/003* (2013.01); *B64D 11/00* (2013.01); *F21V 17/06* (2013.01); *B64D 2011/0038* (2013.01); *B64F 5/40* (2017.01)

(58) Field of Classification Search
CPC .................. B64D 11/00; B64D 11/003; B64D 2011/0038; B60Q 3/43
See application file for complete search history.

(56) References Cited

U.S. PATENT DOCUMENTS

| 5,129,597 | A  | * | 7/1992  | Manthey ............... B64D 11/003 244/118.5 |
| 7,387,410 | B2 | * | 6/2008  | Sibout ................... F21V 7/0016 362/375 |
| 9,527,437 | B2 |   | 12/2016 | Valentine, Jr. et al. |

* cited by examiner

*Primary Examiner* — Brian M O'Hara
*Assistant Examiner* — Michael B. Kreiner
(74) *Attorney, Agent, or Firm* — The Small Patent Law Group LLC; Jay J. Hoette

(57) ABSTRACT

A keep-out assembly for a stowage bin assembly positioned above at least a portion of one or more seats within a vehicle includes a keep-out lens and a keep-out bracket. The keep-out lens is pellucid and extends between an inner edge and an outer edge. The keep-out lens has a top surface and a bottom surface. The keep-out mounting bracket has a base configured to be mounted to the stowage bin assembly at a top of the stowage bin assembly. The keep-out mounting bracket has a support arm extending from the base. The support arm engages the keep-out lens and supports the bottom surface of the keep-out lens at an elevated position above the stowage bin assembly.

20 Claims, 12 Drawing Sheets

KEEP-OUT ASSEMBLY FOR AN OVERHEAD STOWAGE BIN ASSEMBLY AND METHOD OF CLOSING OUT A MAINTENANCE AREA ABOVE A STOWAGE BIN ASSEMBLY

FIELD OF EXAMPLES OF THE DISCLOSURE

Examples of the present disclosure generally relate to keep-out assemblies for overhead stowage bins within vehicles and methods of closing out a maintenance area above stowage bin assemblies.

BACKGROUND OF THE DISCLOSURE

Vehicles, such as commercial aircraft, typically include overhead stowage bin assemblies above rows of seats within the vehicle. Overhead lighting is mounted to the top of the overhead stowage bin assemblies for providing main cabin lighting and ceiling wash lighting for aesthetic lighting effects. The light assemblies providing the lighting is hidden from passenger view by cover pieces, such as valances along the top of the overhead stowage bin assemblies. The maintenance space for the light assemblies behind the valances and above the tops of the overhead stowage bin assemblies needs to be kept clean and free of debris. Typically, crew members are responsible for keeping the maintenance area clean and free of debris.

SUMMARY OF THE DISCLOSURE

Certain examples of the present disclosure provide a keep-out assembly for a stowage bin assembly positioned above at least a portion of one or more seats within a vehicle including a keep-out lens and a keep-out bracket. The keep-out lens is pellucid and extends between an inner edge and an outer edge. The keep-out lens has a top surface and a bottom surface. The keep-out mounting bracket has a base configured to be mounted to the stowage bin assembly at a top of the stowage bin assembly. The keep-out mounting bracket has a support arm extending from the base. The support arm engages the keep-out lens and supports the bottom surface of the keep-out lens at an elevated position above the stowage bin assembly.

Certain examples of the present disclosure provide a stowage bin assembly configured to be positioned above at least a portion of one or more seats within a vehicle that includes a strongback configured to be fixed to a portion of the vehicle having a top panel including a mounting surface. The stowage bin assembly includes a pivot bin pivotably coupled to the strongback and movable between an open position and a closed position and a valance coupled to the strongback and positioned above the pivot bin. The stowage bin assembly includes a keep-out assembly coupled to the mounting surface of the strongback. The keep-out assembly includes a keep-out lens and a keep-out mounting bracket supporting the keep-out lens. The keep-out lens is pellucid. The keep-out mounting bracket has a base mounted to the strongback above the pivot bin interior of the valance. The keep-out mounting bracket has a support arm extending from the base and supporting the keep-out lens at an elevated position above the strongback such that a pocket is formed between the keep-out lens and the strongback interior of the valance.

Certain examples of the present disclosure provide a method of closing out a maintenance area above a stowage bin assembly that is configured to be positioned above at least a portion of one or more seats within a vehicle. The method includes coupling a base of a keep-out mounting bracket to a top of the stowage bin assembly with a support arm extending from the base away from the stowage bin assembly to an elevated position above the maintenance area. The method includes removably securing a keep-out lens to the support arm to form a pocket between the keep-out lens and the stowage bin assembly defining the maintenance area. The keep-out lens being pellucid and closing off the maintenance area from above and allows the maintenance area to be visible through the keep-out lens.

DETAILED DESCRIPTION OF THE DISCLOSURE

The examples described herein can provide a keep-clean device and keep out assembly and method of closing out a maintenance area above a stowage bin assembly that do not restrict lighting of the cabin of the vehicle. Examples of the present disclosure provide a keep-out assembly for a maintenance area of a stowage bin assembly of a vehicle, such as a commercial aircraft. The keep-out assembly is used to keep debris out of the maintenance area above the stowage bin assembly. Examples of the present disclosure can provide a keep-out assembly that is pellucid to allow light to pass through the keep-out assembly. As such, the maintenance area is visible, such as for visual inspection during maintenance. Additionally, light assemblies in the maintenance area can transmit light through the keep-out assembly for cabin lighting of the vehicle. By closing off the maintenance area to debris, the maintenance area can be kept clean, reducing inspection and cleaning time for the flight crew. By allowing light to pass through the keep-out assembly, the maintenance area is available for use by light assemblies.

Examples of the present disclosure can provide a keep-out assembly that may be positioned in an area that is not visible by passengers of the vehicle for an attractive aesthetic appearance within the vehicle. Examples of the present disclosure provide a keep-out assembly that may be retrofit to existing stowage bin assemblies, such as by mounting to existing hardware without affecting operation of the stowage bin assembly or the light assembly.

Figure 1:
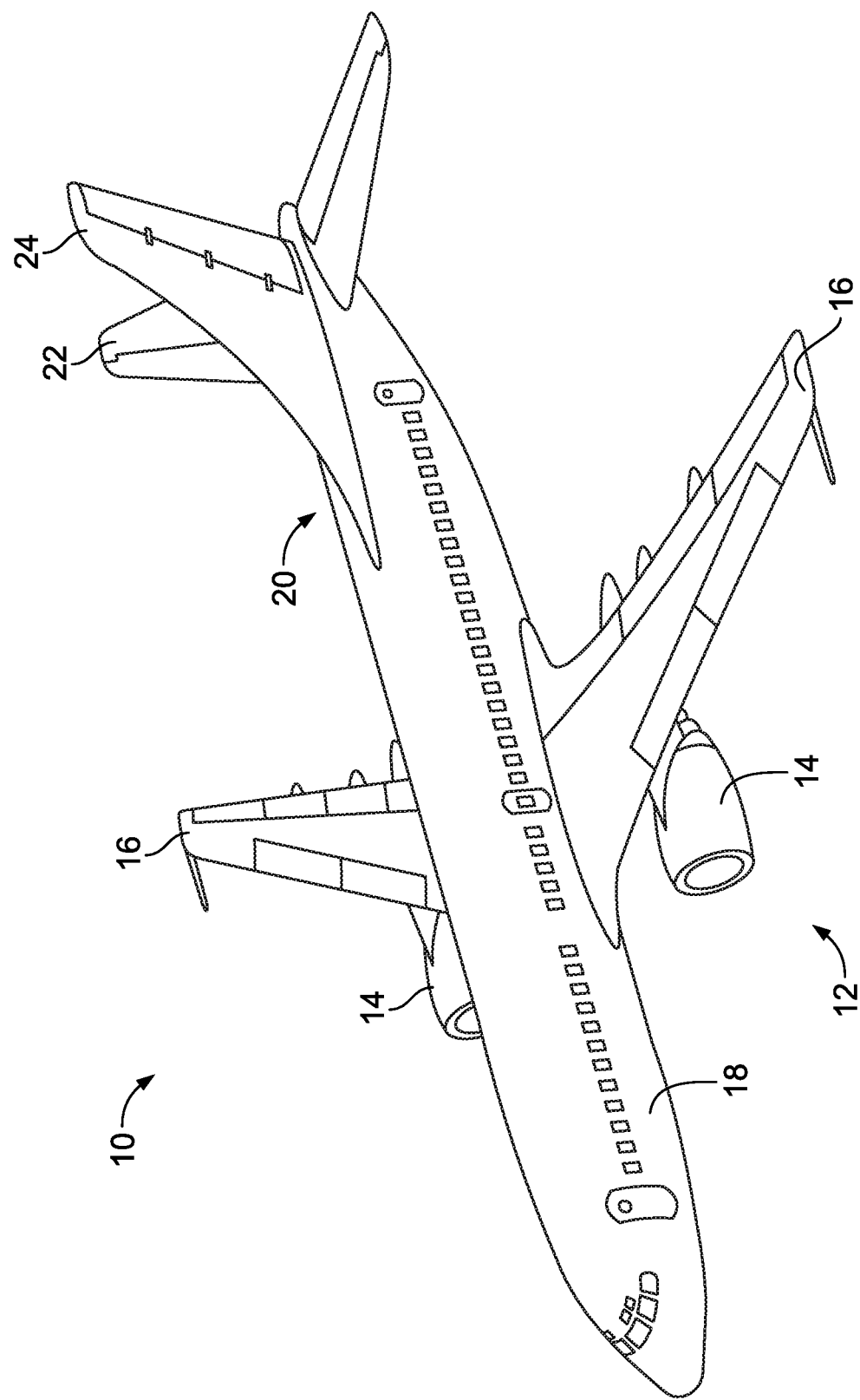
FIG. 1 illustrates a perspective top view of an aircraft, according to an example of the present disclosure.

FIG. 1 illustrates a perspective top view of a vehicle, such as an aircraft 10 (or aircraft assembly), according to an example of the present disclosure. The aircraft 10 may include a propulsion system 12 that may include two turbofan engines 14, for example. Optionally, the propulsion system 12 may include more engines 14 than shown. The engines 14 are carried by wings 16 of the aircraft 10. In other examples, the engines 14 may be carried by a fuselage 18 and/or an empennage 20. The empennage 20 may also support horizontal stabilizers 22 and a vertical stabilizer 24.

The fuselage 18 of the aircraft 10 defines a cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the cabin.

Alternatively, instead of an aircraft, examples of the present disclosure may be used with various other vehicles, such as automobiles, buses, locomotives and train cars, seacraft, spacecraft, and the like.

Figure 2:
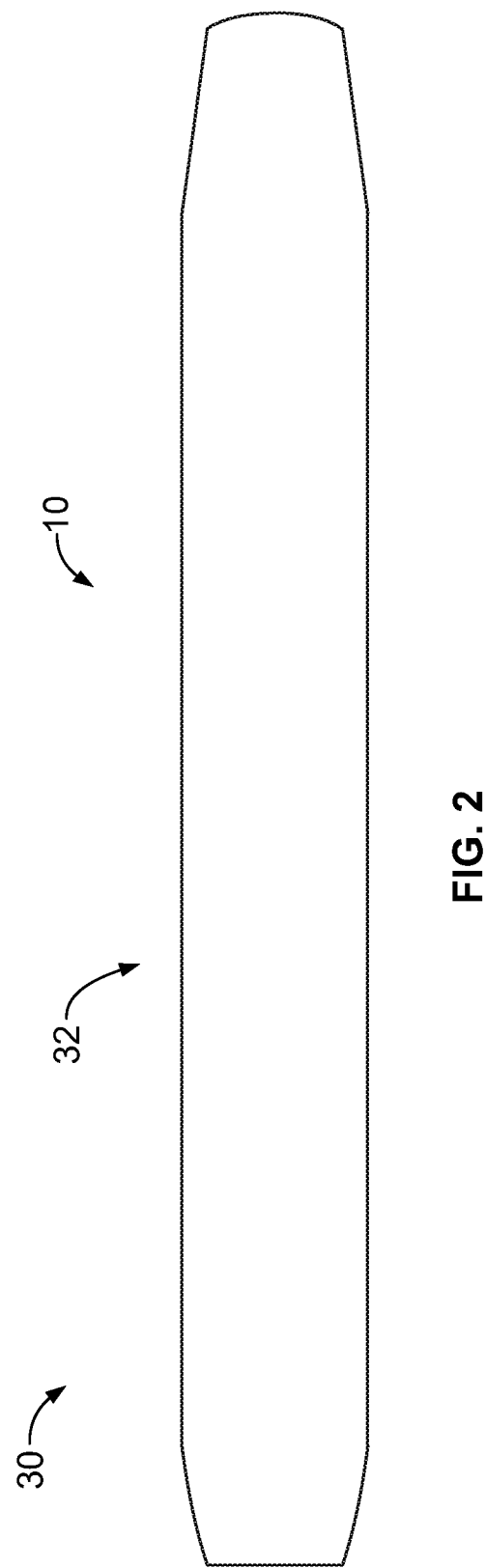
FIG. 2 illustrates a top plan view of a cabin of an aircraft, according to an example of the present disclosure.

FIG. 2 illustrates a top plan view of a cabin 30 of an aircraft according to an example of the present disclosure. The cabin 30 may be within a fuselage 32 of the aircraft 10. For example, one or more fuselage walls may define the cabin 30.

Figure 3:
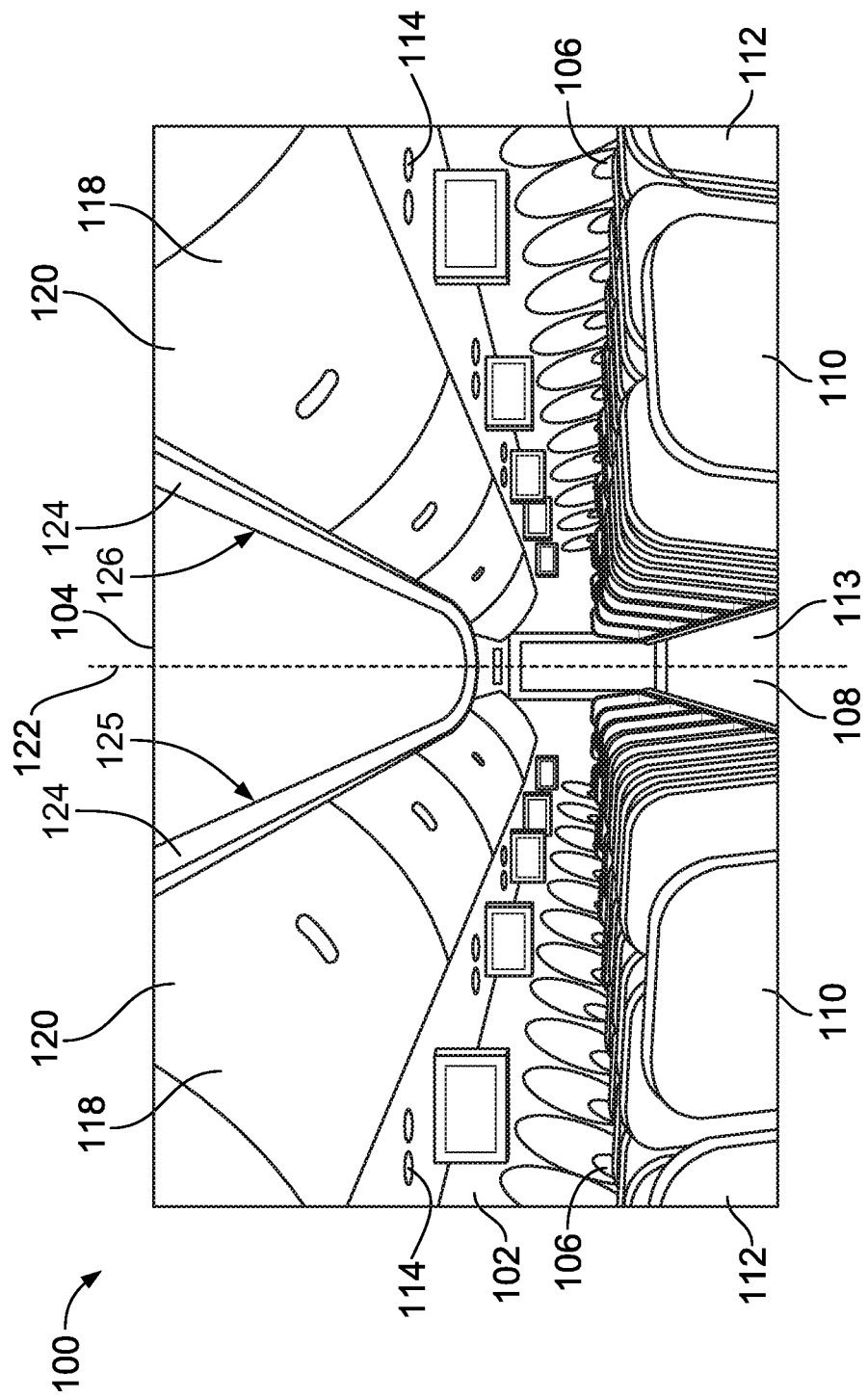
FIG. 3 illustrates a perspective interior view of a cabin of an aircraft showing a keep out assembly for a stowage bin assembly according to an example of the present disclosure.

FIG. 3 illustrates a perspective interior view of a cabin 100 of an aircraft, such as the aircraft 10 (shown in FIG. 1), according to an example of the present disclosure. The cabin 100 includes outboard walls 102 connected to a ceiling 104. Windows 106 may be formed within the outboard walls 102. A floor 108 supports rows of seats 110. As shown in FIG. 3, a row 112 may include three seats 110 on either side of an aisle 113. However, the row 112 may include more or less seats 110 than shown. Additionally, the cabin 100 may include more aisles than shown.

Passenger service units (PSUs) 114 are secured between an outboard wall 102 and the ceiling 104 on either side of the aisle 113. The PSUs 114 extend between a front end and rear end of the cabin 100. For example, a PSU 114 may be positioned over each seat 110 within a row 112. Each PSU 114 may include a housing that generally contains vents, reading lights, an oxygen bag drop panel, an attendant request button, and other such controls over each seat 110 (or groups of seats) within a row 112.

Overhead stowage bin assemblies 118 are secured to the ceiling 104 and/or the outboard wall 102 above and inboard from the PSU 114 on either side of the aisle 113. The overhead stowage bin assemblies 118 are secured over the seats 110. The overhead stowage bin assemblies 118 extend between the front and rear end of the cabin 100. Each stowage bin assembly 118 may include a bucket or pivot bin 120 mounted to the outboard wall 102 and/or the ceiling 104 by a strongback (hidden from view in FIG. 3). The overhead stowage bin assemblies 118 may be positioned above and inboard from lower surfaces of the PSUs 114. The overhead stowage bin assemblies 118 are configured to be pivoted open in order to receive passenger carry-on baggage and personal items, for example.

As used herein, the terms "outboard" or "outer" means a position that is further away from a central longitudinal plane 122 of the cabin 100 as compared to another component. The terms "inboard" or "inner" means a position that is closer to the central longitudinal plane 122 of the cabin 100 as compared to another component. As used herein, the term "above" means a position that is closer to the ceiling 104 and further away from the floor 108. The term "below" means a position that is closer to the floor 108 and further away from the ceiling 104. For example, the PSU 114 may be outboard and below in relation to the stowage bin assembly 118 and the stowage bin assembly 118 may be inboard and above in relation to the PSU 114.

In an example, one or more stowage bin assembly 118 includes a valance 124 extending along a top of the stowage bin assembly 118, such as for a length of the cabin 100. For example, each of the stowage bin assemblies 118 may include a corresponding valance 124. The valances 124 are located at inboard positions at the tops of the stowage bin assemblies 118. In various examples, the valances 124 are mounted to corresponding stowage bin assemblies 118 to provide decorative finishes to the tops of the stowage bin assemblies 118. The valances 124 may visually cover other components above the stowage bin assemblies 118, such as light assemblies 160 (shown in FIGS. 4 and 5), wiring, ducting, unfinished surfaces, the strongback supporting the stowage bin assemblies 118, mounting brackets, and the like. In an example, a gap 125 is provided at the tops of the stowage bin assemblies 118 between the stowage bin assemblies 118 and the ceiling 104. The gap 125 defines a maintenance area 126 for assembly and/or access of the components (for example, the light assemblies 160, wiring, ducting, the mounting brackets, and the like).

Figure 4:
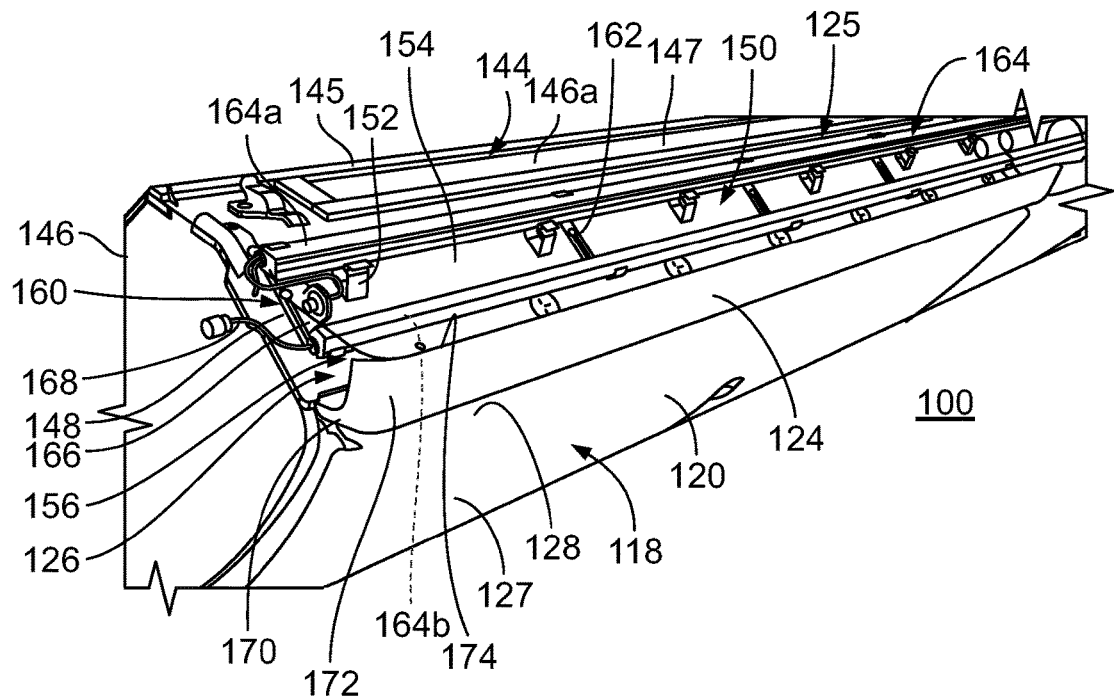
FIG. 4 illustrates a bottom perspective view of the stowage bin assembly shown in FIG. 3 having the keep-out assembly according to an example of the present disclosure.
Figure 5:
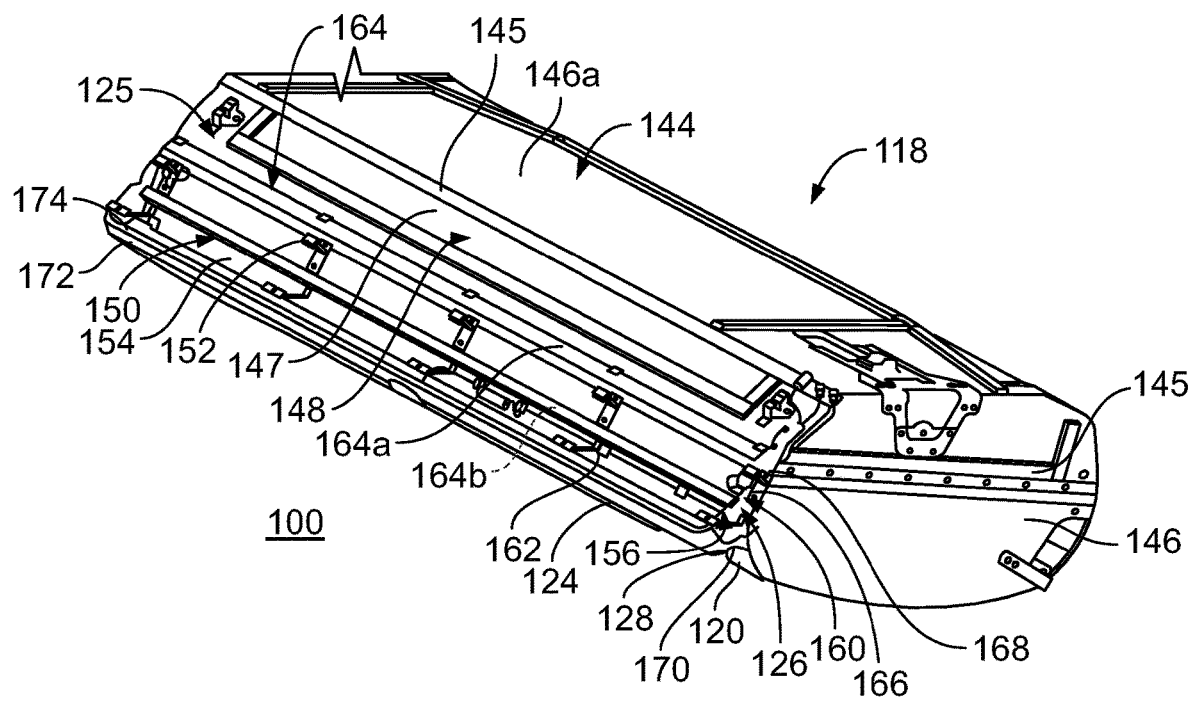
FIG. 5 illustrates a top perspective view of the stowage bin assembly shown in FIG. 3 having the keep-out assembly shown in FIG. 4 according to an example of the present disclosure.

FIG. 4 illustrates a bottom perspective view of a stowage bin assembly 118 in a closed position within the cabin 100, according to an example of the present disclosure. FIG. 5 illustrates a top perspective view of a stowage bin assembly 118 in a closed position within the cabin 100, according to an example of the present disclosure. The stowage bin assembly 118 includes a strongback 144, the pivot bin 120, the valance 124, and a keep-out assembly 150. In various embodiments, the stowage bin assembly 118 includes the light assembly 160.

The strongback 144 is used for mounting the stowage bin assembly 118 in the cabin 100 (shown in FIG. 3) of the vehicle. The strongback 144 is configured to be fixed to a portion of the vehicle, such as the outboard wall 102 and/or the ceiling 104 (both shown in FIG. 3). In various examples, the strongback 144 includes a frame 145, such as a metal frame, that may be fixed to the outboard wall 102 and/or the ceiling 104, such as using fasteners. In various examples, the strongback 144 includes panels 146 defining one or more surfaces of the stowage bin assembly 118. The panels 146 are mounted to the frame 145. The panels 146 may form an enclosure that receives the pivot bin 120. In an example, the panels 146 include a top panel 146a at a top 147 of the stowage bin assembly 118. The top panel 146a is located above the pivot bin 120. The top panel 146a includes a mounting surface 148 for mounting the valance 124 and the keep-out assembly 150 to the strongback 144. In an example, a portion of the top panel 146a is angled downward to form the maintenance area 126 in the gap 125 between the stowage bin assembly 118 and the ceiling 104 (shown in FIG. 3). The valance 124, the light assembly 160 and the keep-out assembly 150 may be mounted to the top panel 146a in the gap 125.

The pivot bin 120 is received in the enclosure and is pivotably coupled to the strongback 144, such as to the panels 146 and/or the frame 145 of the strongback 144. The pivot bin 120 moves between an open position and a closed position for loading or removing baggage from an interior cavity of the pivot bin 120. The pivot bin 120 has a front panel 127 connected to forward and aft end panels (hidden from view in FIGS. 4 and 5). As shown, the front panel 127 may be an arcuate panel having a curved outer surface that curves downwardly from a lip 128 toward the outboard wall 102. The lip 128 of the front panel 127 is located at an inboard location of the front panel 127. In the closed position, the lip 128 is located adjacent the valance 124. The lip 128 moves downward and may additionally move inward as the pivot bin 120 is moved to the open position to access the interior cavity of the pivot bin 120.

In an example, light assembly 160 includes light mounting brackets 162, lights 164 and light ballasts 166. The lights 164 are electrically connected to the light ballasts 166, such as via power cables 168. The light ballasts 166 are mounted to the mounting surface 148 of the strongback 144, such as using fasteners. For example, the light ballasts 166 may be mounted to the frame 145 and/or the top panel 146a. The light mounting brackets 162 are mounted to the mounting surface 148 of the strongback 144, such as using fasteners. For example, the light mounting brackets 162 may be mounted to the frame 145 and/or the top panel 146a. The light mounting brackets 162 are used to mount the lights 164 to the top 147 of the stowage bin assembly 118, such as in the maintenance area 126.

In various examples, different types of lights 164 may be coupled to the strongback 144. For example, in the illustrated example, the light assembly 160 includes a main cabin light 164a and a ceiling wash light 164b. The main cabin light 164a provides primary lighting for the cabin 100 of the vehicle. The ceiling wash light 164b provides secondary or aesthetic lighting for the cabin 100 of the vehicle. The intensity or brightness of the main cabin light 164a may be different than the ceiling wash light 164b. For example, the main cabin light 164a may be brighter than the ceiling wash light 164b. The color of the main cabin light 164a may be different than the ceiling wash light 164b. For example, the main cabin light 164a may be white light while the ceiling wash light 164b may be colored light, such as blue light. In various examples, the main cabin light 164a is aimed in a different direction than the ceiling wash light 164b. For example, the ceiling wash light 164b may be aimed upward toward the ceiling 104, whereas the main cabin light 164a may be aimed inward and/or downward to direct the light into the cabin 100. In the illustrated example, the main cabin light 164a is mounted above and outboard of the ceiling wash light 164b, whereas the ceiling wash light 164b is located closer to the valance 124.

The valance 124 is coupled to the strongback 144 and positioned above the pivot bin 120. In the illustrated example, the valance 124 is provided at the inner end of the stowage bin assembly 118, such as at the top panel 146a. The valance 124 may be coupled to the mounting surface 148 in various examples. The valance 124 covers a portion of the gap 125. For example, the valance 124 visually blocks the line of sight of the passengers from the cabin 100 into the maintenance area 126 such that the passengers do not visually see the strongback 144, the light assembly 160, and/or the keep-out assembly 150. The valance 124 includes a bottom wall 170, an inner wall 172 and a top edge 174. The bottom wall 170 may be mounted to the strongback 144. The inner wall 172 is visible from the cabin 100. The bottom wall 170 may be visible when the pivot bin 120 is open.

The keep-out assembly 150 is coupled to the mounting surface 148 of the strongback 144. The keep-out assembly 150 closes off at least a portion of the maintenance area 126 from above to keep debris out of the maintenance area 126. The keep-out assembly 150 includes a keep-out mounting bracket 152 and a keep-out lens 154. In various embodiments, the keep out assembly 150 includes a plurality of keep-out mounting brackets 152 supporting the keep-out lens 154. The keep-out mounting brackets 152 are mounted to the strongback 144 either directly using fasteners or indirectly, such as by mounting to other components already mounted to the strongback 144, such as the light mounting bracket 162. For example, the keep-out mounting brackets 152 may be retrofit to the stowage bin assembly 118 by mounting to the light mounting brackets 162 already existing within the vehicle. In other various examples, a combination light mounting bracket and keep-out mounting bracket may be provided and installed on the strongback 144 that supports both the lights 164 and the keep-out lens 154. Optionally, the keep-out lens 154 may be entirely supported by the keep-out mounting brackets 152 on the stowage bin assembly 118 at the elevated position without other supporting structure supporting the keep-out lens 154 or other components touching the keep-out lens 154.

In an example, the keep-out lens 154 is pellucid allowing light to pass therethrough. For example, the keep-out lens 154 may be transparent or translucent. In an example, the keep-out lens 154 is clear allowing light to pass therethrough. In other various examples, the keep-out lens 154 may be colored to change the color of light passing therethrough for a colored effect on the ceiling 104. The keep-out lens 154 is positioned at an elevated position above the strongback 144 such that a pocket 156 is formed between the keep-out lens 154 and the strongback 144 interior of the valance 124. The pocket 156 is part of the maintenance area 126. In an example, at least a portion of the light assembly 160 is located in the pocket 156. For example, in the illustrated example, the ceiling wash light 164b is located in the pocket 156 and the main cabin light 164a is located outside of the pocket 156. However, in alternative examples, the main cabin light 164a may additionally or alternatively be located in the pocket 156.

In an example, the stowage bin assembly 118 is configured to be positioned above at least a portion of one or more seats within a vehicle. In an example, the stowage bin assembly 118 includes the strongback 144 configured to be fixed to a portion of the vehicle. The strongback 144 includes the top panel 146a including the mounting surface 148. In an example, the stowage bin assembly 118 includes the pivot bin 120 pivotably coupled to the strongback 144 and movable between an open position and a closed position. In an example, the stowage bin assembly 118 includes the valance 124 coupled to the strongback 144 and positioned above the pivot bin 120. In an example, the stowage bin assembly 118 includes the keep-out assembly 150 coupled to the mounting surface 148 of the strongback 144. In an example, the keep-out assembly 150 includes the keep-out lens 154 and the keep-out mounting bracket 152 supporting the keep-out lens 154. In an example, the keep-out lens 154 is pellucid. In an example, the keep-out mounting bracket 152 has a base 180 (FIG. 6) mounted to the strongback 144 above the pivot bin 120. In an example, the keep-out mounting bracket 152 is positioned interior of the valance 124. In an example, the keep-out mounting bracket 152 has a support arm 183, 184 (FIG. 6) extending from the base 180 and supporting the keep-out lens 154 at an elevated position above the strongback 144 such that the pocket 156 is formed between the keep-out lens 154 and the strongback 144. In an example, the pocket 156 is located interior of the valance 124. In an example, the support arm 183, 184 holds the keep-out lens 154 at a non-horizontal angle and at a non-vertical angle. In an example, the support arm 183, 184 holds an inner edge 190 (FIG. 7) of the keep-out lens 154 adjacent a top edge 174 (FIG. 8) of the valance 124 to close off the pocket 156 outward of the valance 124. In an example, the stowage bin assembly 118 includes the light assembly 160 having the light 164 mounted to the mounting surface 148 of the strongback 144 by the light mounting bracket 162. In an example, the base 180 includes a tab 181 (FIG. 6) mounted to the light mounting bracket 162. In an example, the support arm 183, 184 supports the keep-out lens 154 above the light 164 of the light assembly 160 with the light 164 in the pocket 156.

Figure 6:
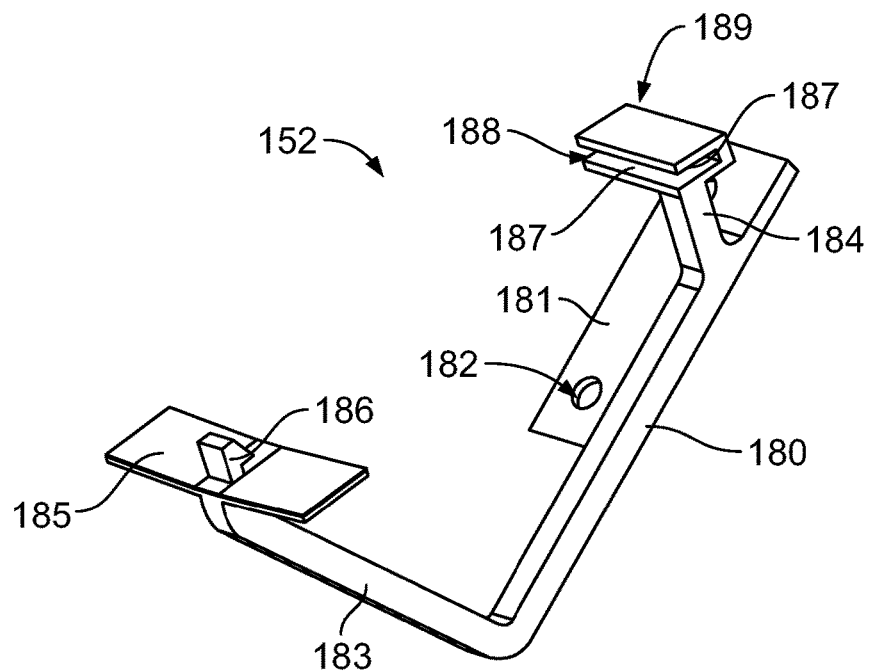
FIG. 6 illustrates a top perspective view of a keep-out mounting bracket of the keep-out assembly shown in FIG. 4 in accordance with an example of the present disclosure.

FIG. 6 illustrates a top perspective view of the keep-out mounting bracket 152 in accordance with an example. The keep-out mounting bracket 152 includes a base 180 configured to be mounted to the stowage bin assembly 118 at the top 147 of the stowage bin assembly 118. The base 180 includes a tab 181 having openings 182 configured to receive fasteners to secure the keep-out mounting bracket 152 to the stowage bin assembly 118. Other types of mounting features may be provided in alternative examples for securing the keep-out mounting bracket 152 to the stowage bin assembly 118, such as clips, the latching features, weld plates and the like.

The keep-out mounting bracket 152 includes one or more support arms extending from the base 180. The support arms engage the keep-out lens 154 to support the keep-out lens 154 (shown in FIG. 7). In the illustrated example, the keep-out mounting bracket 152 includes an inner support arm 183 and an outer support arm 184. The inner support arm 183 is located proximate to an inner end of the base 180 and is used for supporting an inner end of the keep-out lens 154. The outer support arm 184 is located proximate to an outer end of the base 180 and is used for supporting an outer end of the keep-out lens 154. In various examples, the inner support arm 183 and the outer support arm 184 may have different lengths for supporting the keep-out lens 154 at an angle relative to the base 180. For example, in the illustrated example, the inner support arm 183 is longer than the outer support arm 184.

The inner support arm 183 includes a support surface 185 for supporting the keep-out lens 154. The inner support arm 183 includes a securing feature 186 for securing the keep-out lens 154 to the inner support arm 183. In the illustrated example, the securing feature 186 is defined by a latch configured to be latchably coupled to the keep-out lens 154. Other types of securing features 186 may be used in alternative examples, such as a clip, a fastener and the like.

The outer support arm 184 includes one or more support surface 187 for supporting the keep-out lens 154. The outer support arm 184 includes a securing feature 188 for securing the keep-out lens 154 to the outer support arm 184. In the illustrated example, the securing feature 188 is defined by a clip 189 configured to clip to the keep-out lens 154. For example, the securing feature 188 may include a beam having two substantially linear portions connected by a connecting portion, which may be arcuate. The securing feature 188 may form a slot that receives the keep-out lens 154. The securing feature 188 may define the support surfaces 187, such as below and above the slot for supporting the keep-out lens 154 and preventing lift off of the keep-out lens 154 from the outer support arm 184. Other types of securing features 186 may be used in alternative examples, such as a clip, a fastener, and the like.

Figure 7:
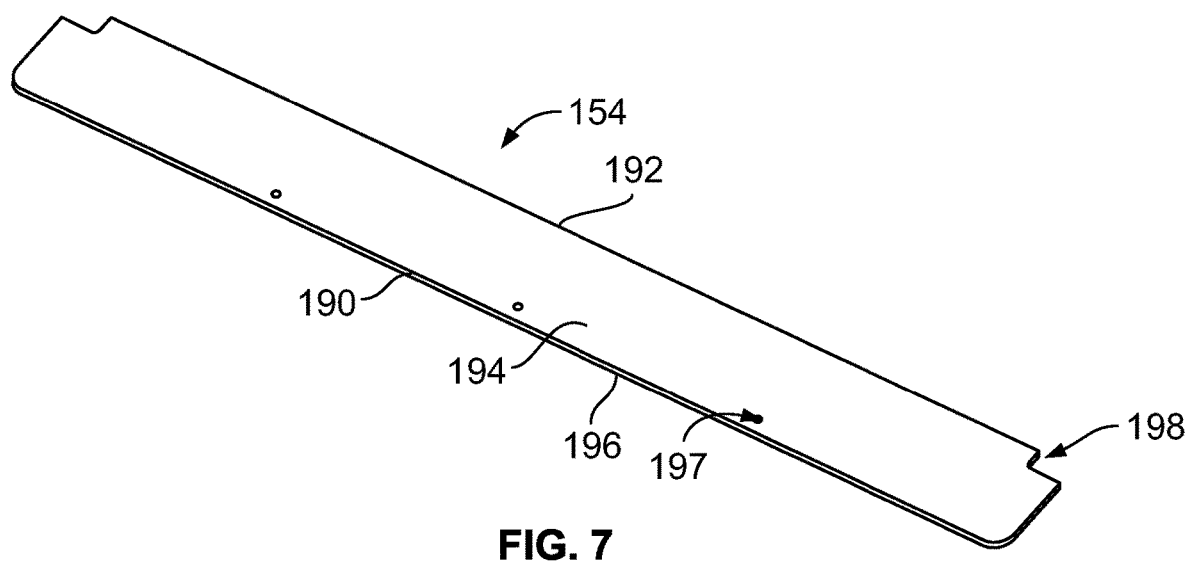
FIG. 7 illustrates a top perspective view of a keep-out lens of the keep-out assembly shown in FIG. 4 in accordance with an example of the present disclosure.

FIG. 7 illustrates a top perspective view of the keep-out lens 154 in accordance with an example. The keep-out lens 154 includes an inner edge 190 and an outer edge 192. In various examples, the inner edge 190 extends parallel to the outer edge 192. However, the keep-out lens 154 may have other shapes in alternative examples, such as having the inner edge 190 nonparallel to the outer edge 192.

The keep-out lens 154 includes a top surface 194 and a bottom surface 196. In various examples, the top surface 194 extends between the inner edge 190 and the outer edge 192. In various examples, the bottom surface 196 extends between the inner edge 190 and the outer edge 192. In various examples, the keep-out lens 154 is planar having the top surface 194 parallel to the bottom surface 196. In alternative examples, the keep-out lens 154 may be nonplanar, such as being curved. For example, the keep-out lens 154 may be concave or convex between the inner edge 190 and the outer edge 192.

In an example, the keep-out lens 154 is pellucid being manufactured from a material that is pellucid. The keep-out lens 154 allows light to be transmitted therethrough. For example, the keep-out lens 154 may be a clear plastic or glass material.

The keep-out lens 154 includes openings 197 that receive corresponding keep-out mounting brackets 152 (shown in FIG. 6). For example, the openings 197 may be positioned proximate to the inner edge 190 to receive securing features 186 of the inner support arms 183 (shown in FIG. 6). The openings 197 may be located at other locations for receiving other portions of the keep-out mounting brackets 152, such as proximate to the outer edge 192 to receive securing features 188 of the outer support arms 184 (shown in FIG. 6). In other various examples, the outer edge 192 is received in the slot of the securing features 188 of the outer support arms 184 rather than having designated openings that receive the outer support arms 184.

In various examples, the keep-out lens 154 includes access openings 198 that receive components to allow access from above and/or from below the keep-out lens 154. The access openings 198 may allow access from above the top surface 194 of the keep-out lens 154 to the maintenance area 126 closed off below the bottom surface 196 of the keep-out lens 154. For example, components of the light assembly 160, such as wires, the light ballast 166, and the like may pass through the access openings 198. In the illustrated example, the access openings 198 are provided at the outer edge 192. However, the access openings 198 may be provided at other locations, such as at the inner edge 190 or at an interior location of the keep-out lens 154.

Figure 8:
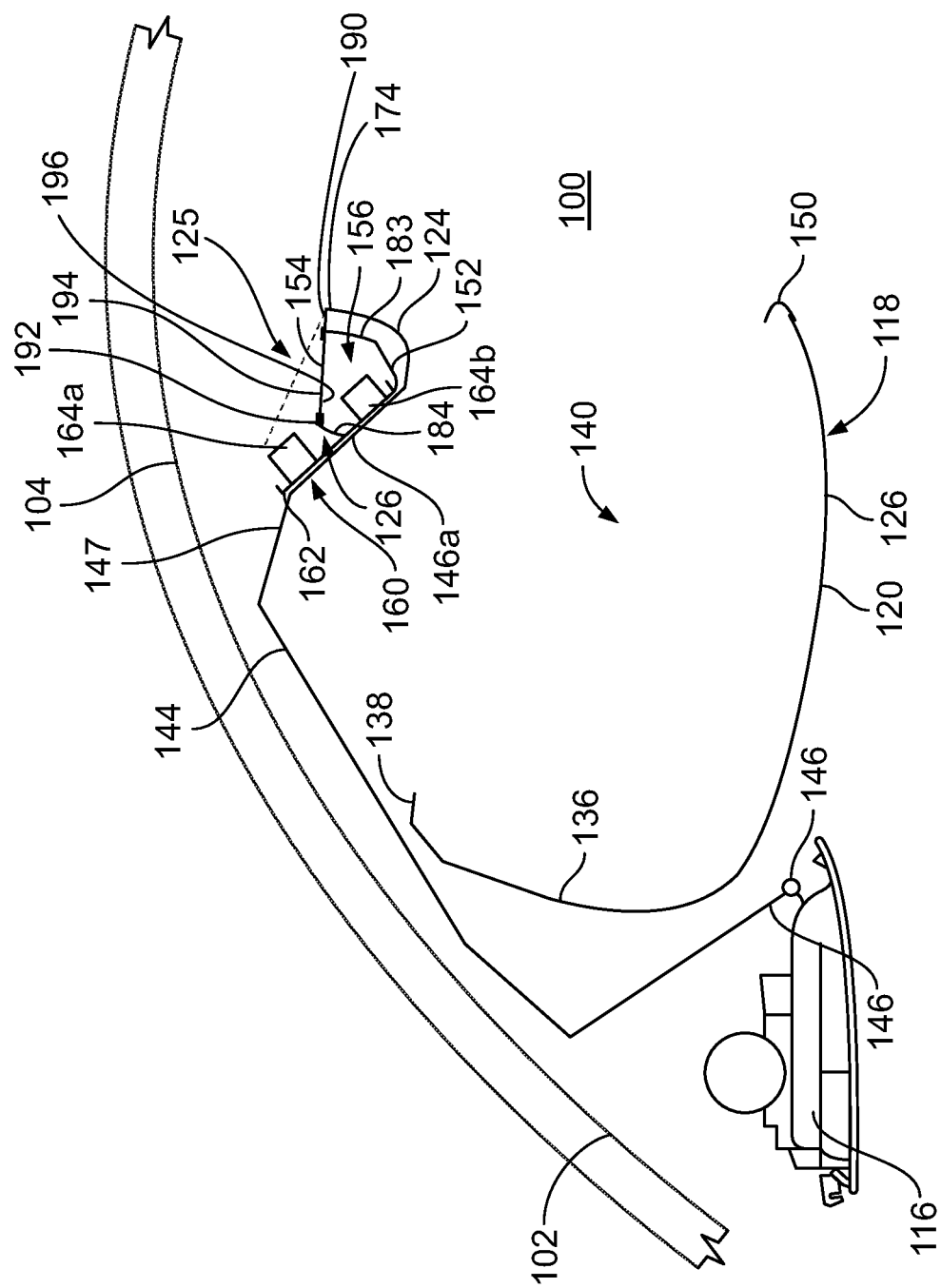
FIG. 8 illustrates a simplified axial cross-sectional view of the stowage bin assembly shown in FIG. 3 in an open position, according to an example of the present disclosure.
Figure 9:
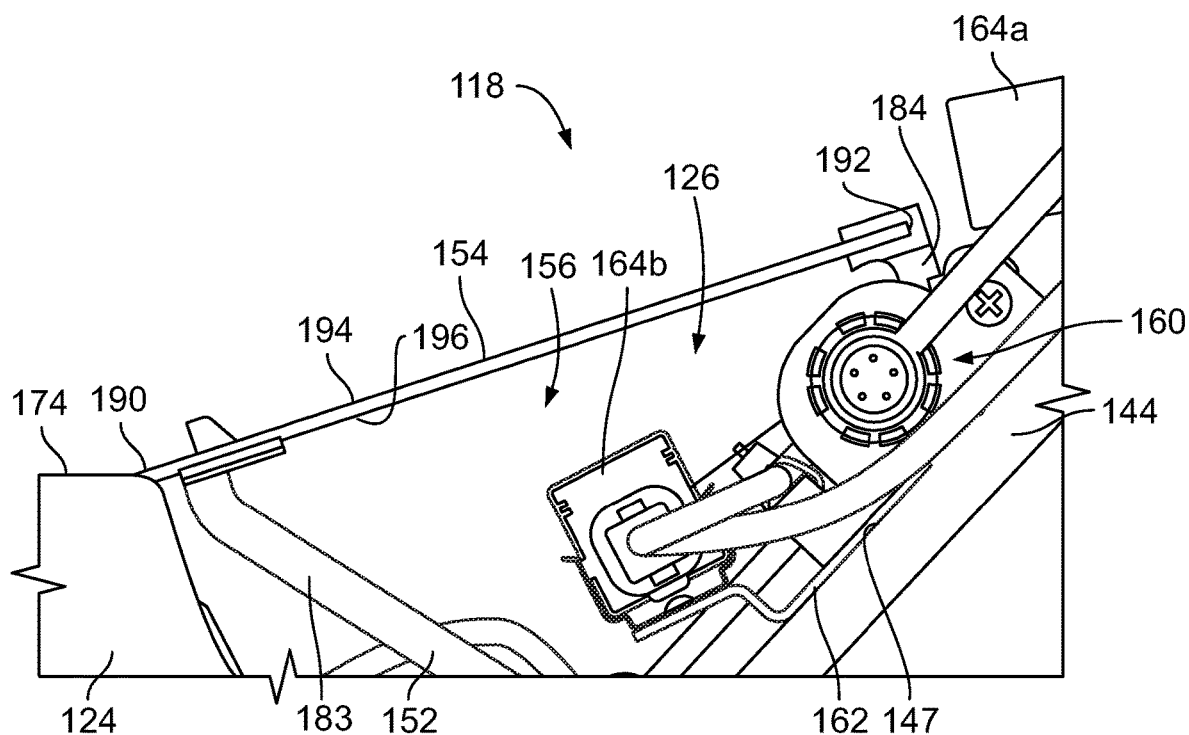
FIG. 9 illustrates an enlarged, side view of a portion of the stowage bin assembly shown in FIG. 3 showing the keep-out assembly in accordance with an example of the present disclosure.

FIG. 8 illustrates a simplified axial cross-sectional view of the stowage bin assembly 118 in an open position within the cabin 100, according to an example of the present disclosure. FIG. 9 illustrates an enlarged, side view of a portion of the stowage bin assembly 118 in accordance with an example showing the keep-out assembly mounted to the top 147 of the stowage bin assembly 118. As shown in FIG. 8, the pivot bin 120 is pivotally secured to the strongback 144, which is secured to the outboard wall 102 and/or the ceiling 104. The PSU 114 may be secured to a lower edge of the strongback 144.

As shown in FIGS. 8 and 9, the top panel 146a of the strongback 144 is angled downward at the inner end of the stowage bin assembly 118 to define the gap 125. The light mounting brackets 162 of the light assembly 160 secure the lights 164 to the strongback 144. The keep-out mounting brackets 152 are secured to the light mounting brackets 162 to position the keep-out mounting brackets 152 within the maintenance area 126 at the top 147 of the stowage bin assembly 118. The inner support arm 183 engages the keep-out lens 154 proximate to the inner edge 190 and the outer support arm 184 engages the keep-out lens 154 proximate to the outer edge 192 to support the bottom surface 196 of the keep-out lens 154 at an elevated position above the top 147 of the stowage bin assembly 118. The keep-out lens 154 closes off the maintenance area 126, such as to keep debris from entering the pocket 156. The pocket 156 defines a closed off space for other components, such as components of the light assembly 160. The keep-out lens 154 is clear to allow the light from the light 164 to pass through the keep-out lens 154. The keep-out mounting brackets 152 have a low profile and are generally located below and/or behind the light 164 so as to not create shadows.

In an example, the keep-out mounting brackets 152 support the keep-out lens 154 at an angle such that debris or items placed in the maintenance area 126 above the top surface 194 will roll inward off of the keep-out lens 154. The inner support arm 183 holds an inner edge 190 of the keep-out lens 154 adjacent a top edge 174 of the valance 124 to close off the pocket 156 outward of the valance 124. The outer support arm 184 holds the outer edge 192 of the keep-out lens 154 at a position above and outboard of the inner edge 190, such as near the top panel 146a to close out the maintenance area 126 between the top edge 174 of the valance 124 and the top panel 146a. In an example, the keep-out mounting brackets 152 support the keep-out lens 154 at a non-horizontal angle and at a non-vertical angle. Debris or items placed on top of the keep-out lens 154 will fall off of the keep-out lens 154 past the valance 124.

Figure 10:
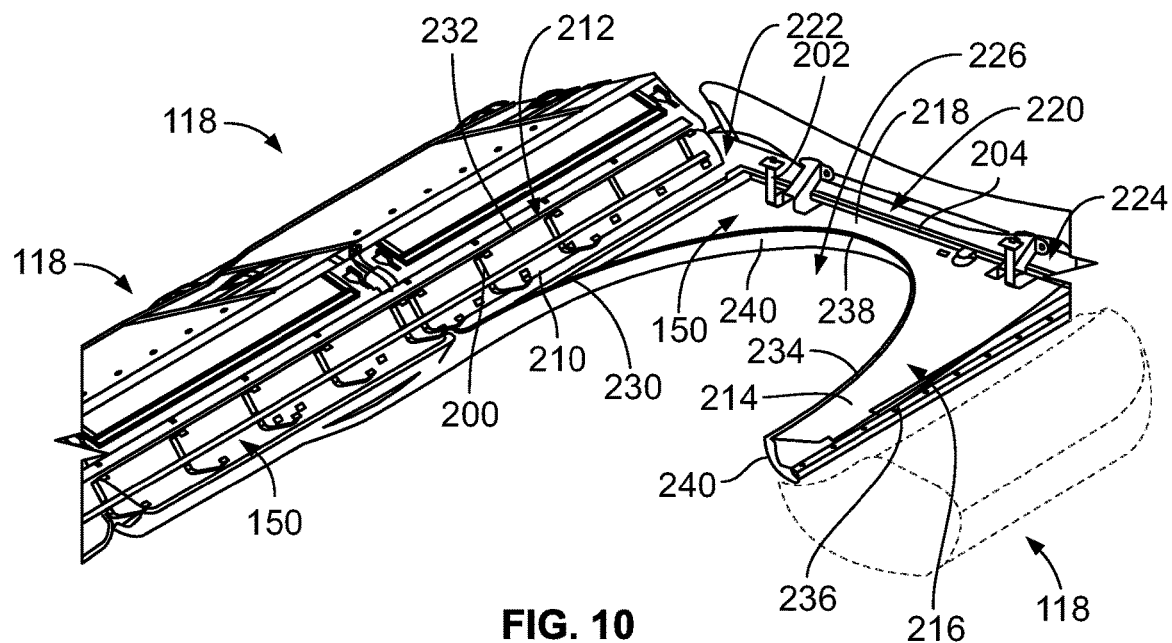
FIG. 10 is a top perspective view of the keep-out assembly shown in FIG. 3 in accordance with an example of the present disclosure.

FIG. 10 is a top perspective view of a keep-out assembly 150 in accordance with an example, such as for use at a bull nose or front of the cabin of the vehicle configured to span across the vehicle between stowage bin assemblies 118 on opposite sides of the vehicle, such as on opposite sides of the aisle 113 (shown in FIG. 3) of the vehicle.

The keep-out assembly 150 includes keep-out mounting brackets, such as side keep-out mounting brackets 200 and front keep-out mounting brackets 202. The keep-out assembly 150 includes a keep-out lens 204 supported by the keep-out mounting brackets 200, 202. Optionally, the keep-out lens 204 is a single piece spanning across the aisle 113 between the opposite stowage bin assemblies 118. In alternative examples, the keep-out lens 204 may be a multi-piece lens having a left keep-out lens and a right keep-out lens on opposite left and right sides of the aisle 113 between the corresponding stowage bin assemblies 118 on the opposite left and right sides of the vehicle.

In an example, the keep-out lens 204 includes a side section 210 at a first side 212 of the keep-out lens 204, a side section 214 at a second side 216 of the keep-out lens 204, and a front section 218 at a front 220 of the keep-out lens 204. The keep-out lens 204 includes a corner section 222 between the side section 210 and the front section 218 and a corner section 224 between the side section 214 and the front section 218. The keep-out lens 204 includes an opening 226 between the side section 210 at the first side 212 and the side section 214 at the second side 216. The opening 226 is located above the aisle 113, such as along the central longitudinal plane of the ceiling 104 of the vehicle. For example, the first side 212 and the second side 216 are on opposite sides of the central longitudinal plane.

In an example, the keep-out lens 204 is nonplanar. For example, the keep-out lens 204 has a curved profile. The side section 210, the corner section 222 and the front section 218 are nonplanar and the side section 210 is angled nonparallel to the front section 218. For example, the side section 210 has an upward angle and the front section 218 is generally horizontal with the corner section 222 curved between the side section 210 and the front section 218. The side section 214, the corner section 224 and the front section 218 are nonplanar and the side section 214 is angled nonparallel to the front section 218. For example, the side section 214 has an upward angle and the front section 218 is generally horizontal with the corner section 224 curved between the side section 214 and the front section 218.

The side section 210 at the first side 212 includes an inner edge 230 and an outer edge 232. The side section 214 at the second side 216 includes an inner edge 234 and an outer edge 236. The front section 218 includes an inner edge 238 and an outer edge 240. In an example, the outer edge 240 is concave between the corner sections 222, 224. For example, the outer edge 232 at the corner section 222 is higher than the inner edge 230 at the corner section 222. Similarly, the outer edge 236 at the corner section 224 is higher than the inner edge 234 at the corner section 224. The keep-out lens 204 may have other shapes in alternative examples.

The side keep-out mounting brackets 200 support the side sections 210, 214. The front keep-out mounting brackets 202 support the front section 218. The inner edges 230, 234, 238 surround the opening 226 and are located adjacent a curved valance 124 that extends between the stowage bin assemblies 118 on opposite sides of the vehicle.

In an example, the keep-out lens 204 is manufactured from a flat piece of material, such as a clear plastic material. The inner edges 230, 234 of the side sections 210, 214 are pulled inward toward each other to form the shape of the opening 226. As the inner edges 230, 234 are pulled inward, the outer edges 232, 236 are bent upward at an angle into a generally bowl-shaped structure with the opening 226 in the middle. The corner sections 222, 224 transition between the side sections 210, 214 and the front section 218 giving the keep-out lens 204 the bowl-shaped curved profile. The keep-out mounting brackets 200, 202 support the shape of the keep-out lens 204.

Figure 11:
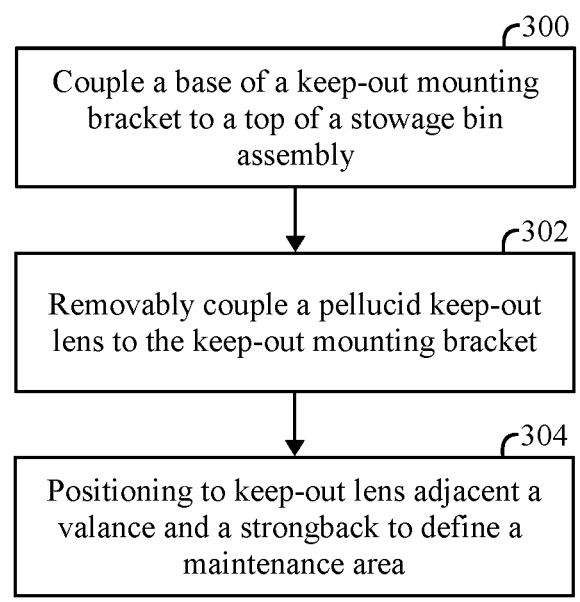
FIG. 11 illustrates a flow chart of a method of closing out a maintenance area above a stowage bin assembly, according to an example of the present disclosure.

FIG. 11 illustrates a flow chart of a method of closing out a maintenance area 126 above a stowage bin assembly 118, according to an example of the present disclosure. The method begins at 300, in which a base 180 of a keep-out mounting bracket 152 is coupled to a top 147 of the stowage bin assembly 118 with at least one support arm 183, 184 of the keep-out mounting bracket 152 extending from the base 180 away from the stowage bin assembly 118 to an elevated position above the maintenance area 126. In various examples, the base 180 is coupled to a light mounting bracket 162 mounted to the top 147 of the stowage bin assembly 118 used for holding a light 164 along the top 147 of the stowage bin assembly 118. As such, the keep-out mounting bracket 152 is coupled to an existing structure such that the keep-out assembly 150 may be retrofit to existing vehicles without changing the other structures or components of the vehicle. In other various examples, the base 180 may be directly coupled to a fixed structure within the vehicle, such as a strongback 144 mounted to an outboard wall 102 and/or ceiling 104 of the vehicle.

After the keep-out mounting bracket 152 is positioned, a pellucid keep-out lens 154 is removably coupled to the support arms 183, 184 to form a pocket 156 between the keep-out lens 154 and the stowage bin assembly 118 defining part of the maintenance area 126 at 302. The keep-out lens 154 closes off the maintenance area 126 from above and allows the maintenance area 126 to be visible through the keep-out lens 154. At 304, the method includes positioning the keep-out lens 154 with an inner edge 190 of the keep-out lens 154 adjacent a valance 124 and an outer edge 192 of the keep-out lens 154 adjacent the strongback 144 of the stowage bin assembly 118 to define the maintenance area 126 under the keep-out lens 154, inward of the valance 124 and above the strongback 144. The pocket 156 below the keep-out lens 154 and behind the valance 124 receives the light 164 of the light assembly 160 along the top 147 of the stowage bin assembly 118. The keep-out lens 154 is positioned above the light 164 such that light waves from the light pass through the keep-out lens 154.

Figure 12:
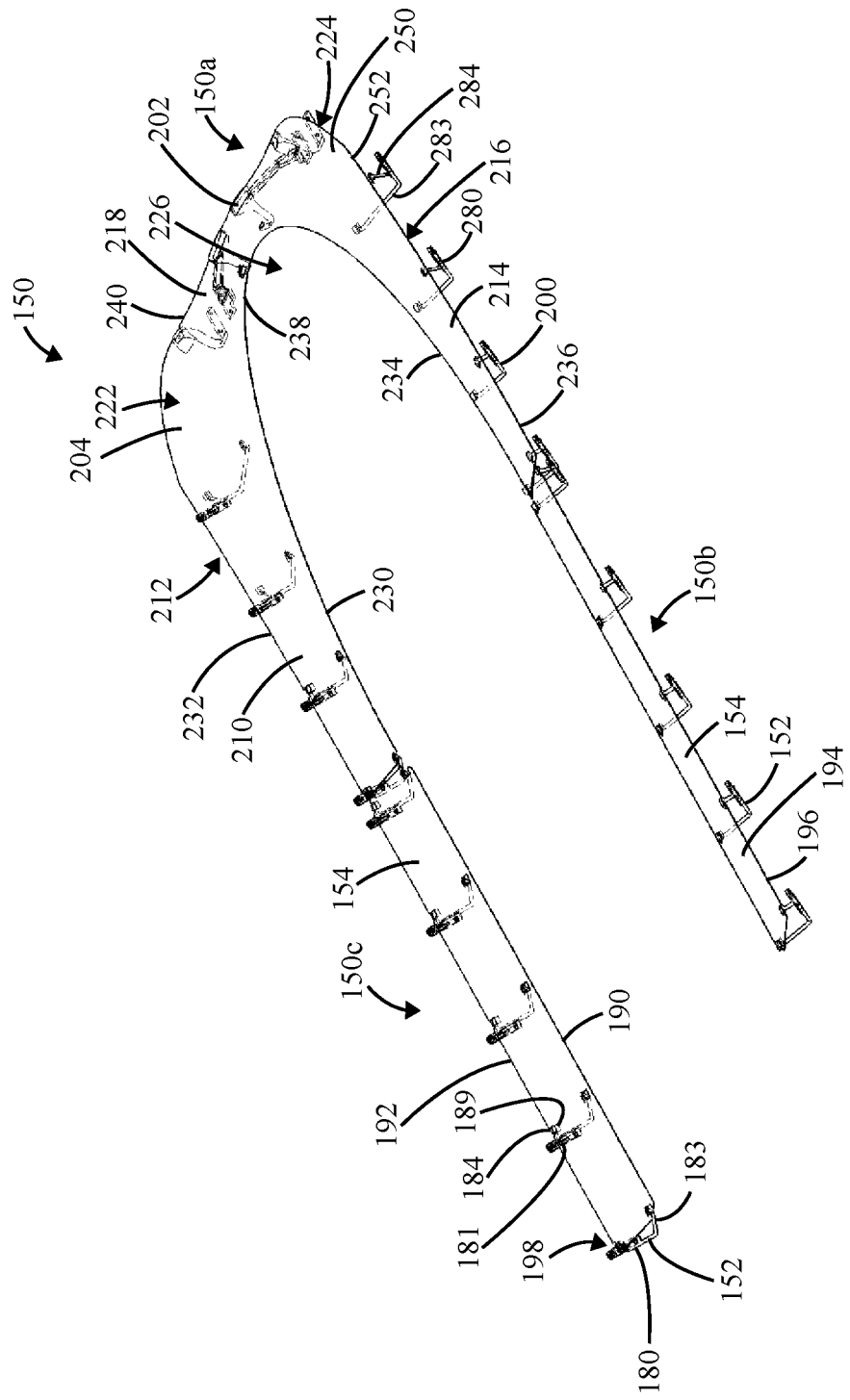
FIG. 12 is a top perspective view of keep-out assemblies 150 in accordance with an exemplary embodiment.
Figure 13:
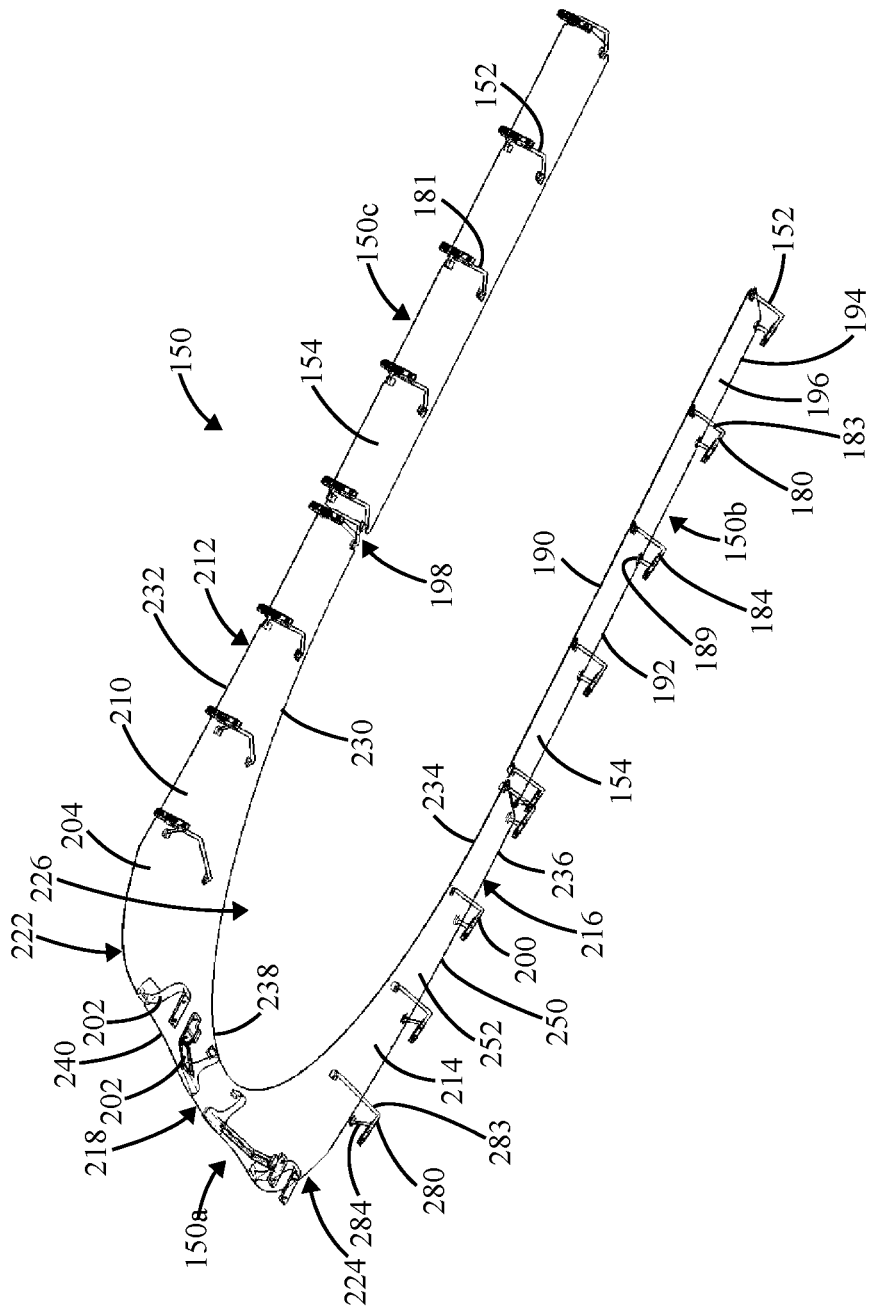
FIG. 13 is a bottom perspective view of the keep out assemblies 150 in accordance with an exemplary embodiment.
Figure 14:
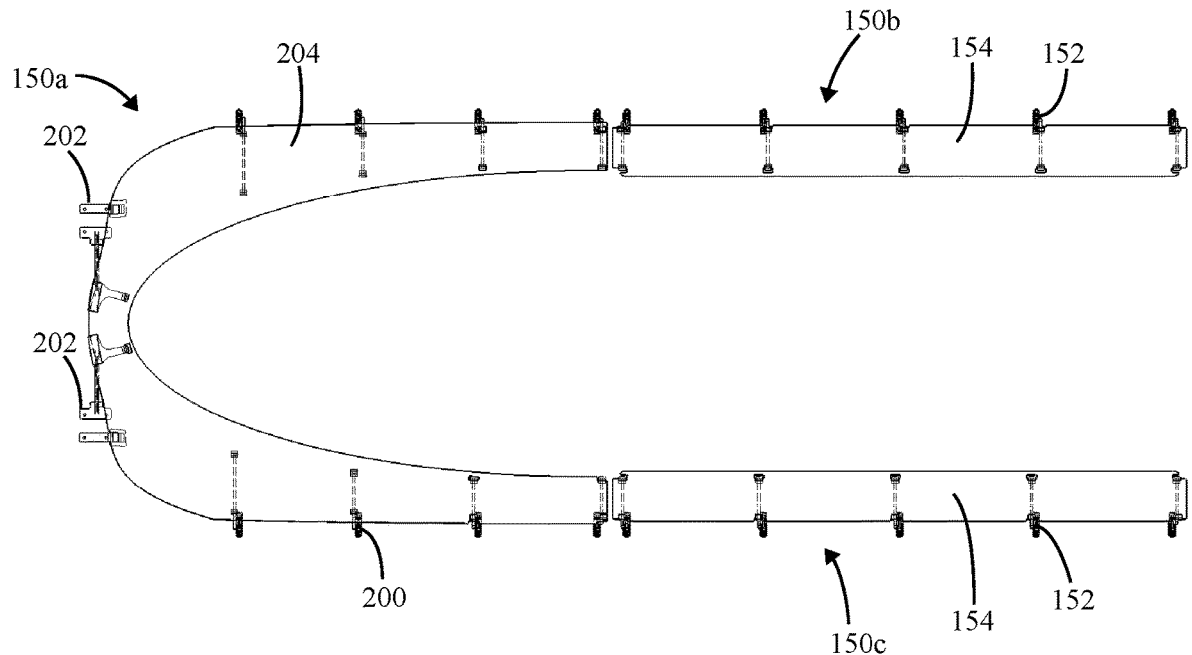
FIG. 14 is a top view of the keep out assemblies 150 in accordance with an exemplary embodiment.
Figure 15:
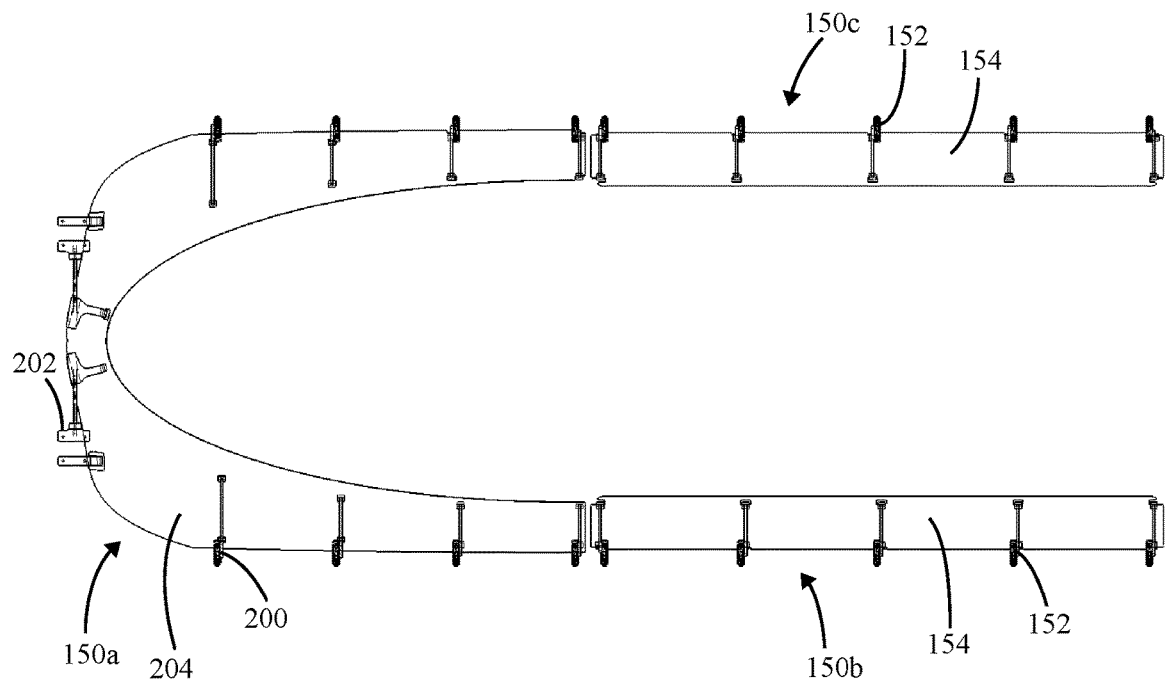
FIG. 15 is a bottom view of the keep out assemblies 150 in accordance with an exemplary embodiment.
Figure 16:
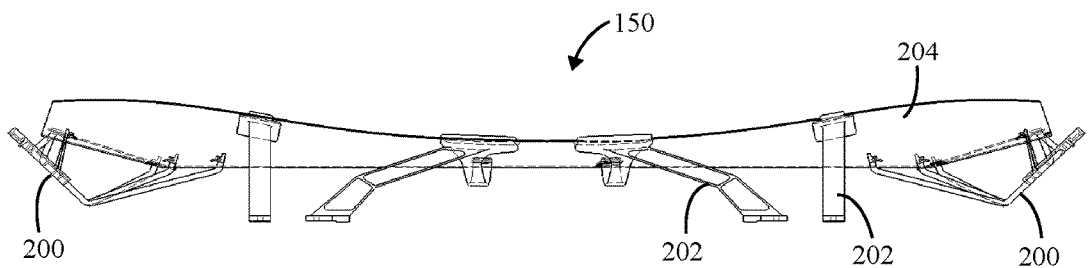
FIG. 16 is a front view of the keep out assemblies 150 in accordance with an exemplary embodiment.
Figure 17:
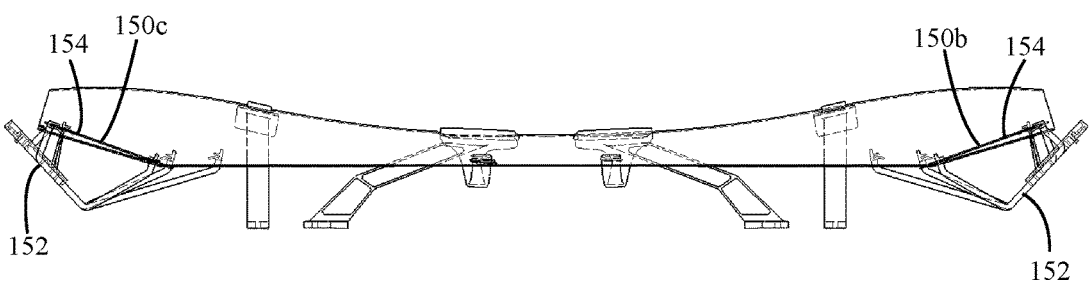
FIG. 17 is a rear view of the keep out assemblies 150 in accordance with an exemplary embodiment.
Figure 18:
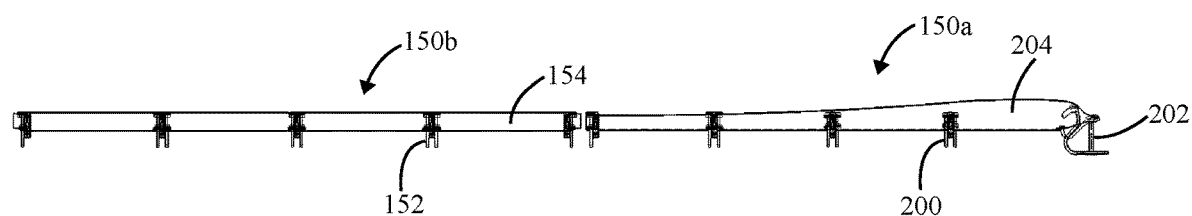
FIG. 18 is a right side view of the keep out assemblies 150 in accordance with an exemplary embodiment.
Figure 19:
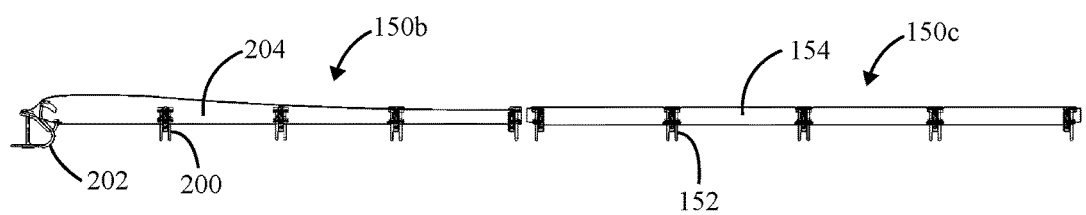
FIG. 19 is a left side view of the keep out assemblies 150 in accordance with an exemplary embodiment.

FIG. 12 is a top perspective view of keep-out assemblies 150 in accordance with an exemplary embodiment. FIG. 13 is a bottom perspective view of the keep out assemblies 150 in accordance with an exemplary embodiment. FIG. 14 is a top view of the keep out assemblies 150 in accordance with an exemplary embodiment. FIG. 15 is a bottom view of the keep out assemblies 150 in accordance with an exemplary embodiment. FIG. 16 is a front view of the keep out assemblies 150 in accordance with an exemplary embodiment. FIG. 17 is a rear view of the keep out assemblies 150 in accordance with an exemplary embodiment. FIG. 18 is a right side view of the keep out assemblies 150 in accordance with an exemplary embodiment. FIG. 19 is a left side view of the keep out assemblies 150 in accordance with an exemplary embodiment.

In an example, the keep out assemblies 150 close out maintenance areas 126 at the top of stowage bin assemblies 118 (FIG. 8) positioned above at least a portion of one or more seats within a vehicle. In an example, the keep out assemblies 150 are positioned together to form a generally continuous keep out structure for multiple stowage bin assemblies 118, such as along both sides of an aisle in the vehicle and at a front end or a rear end of the cabin of the vehicle. For example, the keep out assemblies 150 may include an end keep out assembly 150*a*, a right side keep out assembly 150*b*, and a left side keep out assembly 150*c*.

In an example, the keep-out assembly 150 includes a keep-out lens 154 and a keep-out mounting bracket 152. The keep-out lens 154 is pellucid and extends between an inner edge 190 and an outer edge 192. The keep-out lens 154 has a top surface 194 and a bottom surface 196. The keep-out mounting bracket 152 has a base 180 configured to be mounted to the stowage bin assembly 118 at a top 147 of the stowage bin assembly 118. The keep-out mounting bracket 152 has support arms 183, 184 extending from the base 180. The support arms 183, 184 engage the keep-out lens 154 and supporting the bottom surface 196 of the keep-out lens 154 at an elevated position above the stowage bin assembly 118.

In an example, the support arms 183, 184 hold the keep-out lens 154 at a non-horizontal angle and at a non-vertical angle. In an example, the support arms 183, 184 hold the inner edge 190 of the keep-out lens 154 adjacent a top edge 174 of a valance 124 (FIG. 8) to close off a maintenance area 126 (FIG. 8) outward of the valance 124. In an example, multiple support arms 183, 184 are utilized, such as an inner support arm 183 engaging the keep-out lens 154 proximate to the inner edge 190 and an outer support arm 184 extending from the base 180 engaging the keep-out lens 154 proximate to the outer edge 192. In an example, the base 180 includes a tab 181 configured to be mounted to a light mounting bracket 162 supporting a light 164 of a light assembly 160 (FIG. 8) mounted to the top 147 of the stowage bin assembly 118. The support arms 183, 184 support the keep-out lens 154 above the light 164 of the light assembly 160. In an example, the keep-out lens 154 is entirely supported by the keep-out mounting bracket 152 on the stowage bin assembly 118.

In an example, the keep-out lens 154 is planar. In an example, the keep-out lens 154 includes an access opening 198 providing access from above the top surface 194 of the keep-out lens 154 to a maintenance area 126 closed off by the keep-out lens 154 below the bottom surface 196 of the keep-out lens 154. In an example, the support arms 183, 184 of the keep-out mounting bracket 152 extend from the base 180 to define a maintenance area 126 between the base 180 and the keep-out lens 154 configured to receive a light assembly 160 in the maintenance area 126 above the base 180 and below the keep-out lens 154. In an example, the support arm 184 includes a clip 189 secured to the keep-out lens 154.

In an example, the end keep-out assembly 150*a* includes a keep-out lens 204 and keep-out mounting brackets such as side keep-out mounting brackets 200 and front keep-out mounting brackets 202. The keep-out lens 204 is pellucid and extends between an inner edge 230, 234, 238 and an outer edge 232, 236, 240. The keep-out lens 204 has a top surface 250 and a bottom surface 252. The keep-out mounting bracket 200 has a base 280 configured to be mounted to the stowage bin assembly 118 at a top 147 of the stowage bin assembly 118. The keep-out mounting bracket 200 has support arms 283, 284 extending from the base 280. The support arms 283, 284 engage the keep-out lens 204 and support the bottom surface 252 of the keep-out lens 204 at an elevated position above the stowage bin assembly 118. In an example, the keep-out lens 204 has a curved profile.

In an example, the keep-out lens 204 has a first side 212 and a second side 216 with an opening 226 therebetween located above an aisle of the vehicle at a central longitudinal plane 122 of a ceiling 104 of the vehicle such that the first side 212 and the second side 216 are on opposite sides of the central longitudinal plane. In an example, the keep-out lens 154 includes side sections 210. 214, a front section 218, and corner sections 222, 224 between the front section 218 and the side sections 210, 214, respectively. The side sections 210, 214, the front section 218, and the corner sections 222, 224 are nonplanar. The side sections 210, 214 are angled nonparallel to the front section 218. The corner sections 222, 224 are curved between the side sections 210, 214 and the front section 218.

In contrast to known stowage bin assemblies, examples of the present disclosure close out the maintenance area at the top of the stowage bin assemblies. The keep-out assemblies of the present disclosure are located in the maintenance area and define a pocket or space to allow other components, such as components of the light assemblies to be located in the maintenance area. Examples of the present disclosure provide a clear keep-out lens that allows light from the light assemblies to pass therethrough such that the area below the keep-out lens may still be usable for mounting lights of the light assemblies therein. Examples of the present disclosure provide a keep-out lens that allows components under the keep-out lens to be visible for maintenance. The keep-out lens is removable to access the components in the maintenance area. Examples of the present disclosure orient the keep-out lens to keep debris out of the maintenance area and may be oriented at an angle such that debris or items placed on top of the keep-out lens roll off of the keep-out assembly. Examples of the present disclosure allow mounting of the keep-out assembly to existing structures for ease of assembly and for retrofitting existing vehicles without having to redesign mounting structures for the various components, such as the light assemblies.

While various spatial and directional terms, such as top, bottom, lower, mid, lateral, horizontal, vertical, front and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples of the disclosure without departing from their scope. While the dimensions and types of materials described herein are intended to define the parameters of the various examples of the disclosure, the examples are by no means limiting and are examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein". Moreover, the terms "first", "second", and "third", etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A keep-out assembly for a vehicle, the vehicle comprising a passenger area that comprises seats, the vehicle further comprising a stowage bin assembly, positioned above at least a portion of one or more of the seats, the stowage bin assembly comprising a top and further comprising a valance, located at an inboard position along the stowage bin assembly at the top of the stowage bin assembly, the valance covering a maintenance area above the top of the stowage bin assembly outboard of the valance, the keep-out assembly comprising:
   a keep-out lens, received in the maintenance area, wherein the keep-out lens is pellucid and comprises an inner edge, an outer edge, a top surface, and a bottom surface; and
   a keep-out mounting bracket, received in the maintenance area,
   wherein
      the keep-out mounting bracket comprises a base, configured to be mounted to the stowage bin assembly at the top of the stowage bin assembly outboard of the valance, and further comprising
      a support arm, extending from the base, and
      the support arm engages the keep-out lens and supports the bottom surface of the keep-out lens at an elevated position above the top of the stowage bin assembly.

2. The keep-out assembly of claim 1, wherein the support arm holds the keep-out lens at a non-horizontal orientation and at a non-vertical orientation.

3. The keep-out assembly of claim 1, wherein:
   the valance comprises a top edge, and
   the support arm extends from the base to hold the inner edge of the keep-out lens adjacent the top edge of the valance to close off the maintenance area outward of the valance.

4. The keep-out assembly of claim 1, wherein:
   the support arm is an inner support arm, engaging the keep-out lens proximate to the inner edge,
   the keep-out mounting bracket further comprises an outer support arm, extending from the base, and
   the outer support arm engages the keep-out lens proximate to the outer edge.

5. The keep-out assembly of claim 1, wherein:
   the stowage bin assembly further comprises a light assembly, comprising a light and a light mounting bracket, supporting the light,
   the light mounting bracket is mounted to the top of the stowage bin assembly,
   the base comprises a tab, configured to be mounted to the light mounting bracket, and
   the support arm supports the keep-out lens above the light of the light assembly.

6. The keep-out assembly of claim 1, wherein:
   the keep-out lens comprises an access opening, providing access to the maintenance area from above the top surface of the keep-out lens, and
   the keep-out lens closes off the maintenance area from below the bottom surface of the keep-out lens.

7. The keep-out assembly of claim 1, wherein:
the stowage bin assembly further comprises a light assembly above the top of the stowage bin assembly outboard of the valance in the maintenance area,
the base extends into the maintenance area below the light assembly, and
the support arm of the keep-out mounting bracket extends from the base to hold the keep-out lens above the light assembly in the maintenance area.

8. The keep-out assembly of claim 1, wherein the support arm comprises a clip secured to the keep-out lens.

9. The keep-out assembly of claim 1, wherein the keep-out lens is entirely supported by the keep-out mounting bracket on the stowage bin assembly.

10. The keep-out assembly of claim 1, wherein the keep-out lens comprises a planar profile surface.

11. The keep-out assembly of claim 1, wherein the keep-out lens comprises a curved profile surface.

12. The keep-out assembly of claim 1, wherein:
the vehicle further comprises an aisle in the passenger area between the seats and still further comprises a ceiling above the passenger area,
the ceiling extends along a central longitudinal plane,
the keep-out lens further comprises a first side, and a second side, and an opening between the first side and the second side, and
the opening is located above the aisle of the vehicle at the central longitudinal plane of the ceiling of the vehicle such that the first side of the keep-out lens and the second side of the keep-out lens are on opposite sides of the central longitudinal plane.

13. The keep-out assembly of claim 1, wherein:
the keep-out lens comprises a side section, a front section, and a corner section between the side section and the front section,
the side section, the front section, and the corner section are nonplanar,
the side section is nonparallel to the front section, and
the corner section is curved between the side section and the front section.

14. A stowage bin assembly for a vehicle, the vehicle comprising a passenger area that has seats, the stowage bin assembly comprising:
a strongback, configured to be fixed to a portion of the vehicle and comprising a top panel that comprises a mounting surface;
a pivot bin, pivotably coupled to the strongback, movable between an open position and a closed position, and comprising a top;
a valance, coupled to the strongback, wherein
the valance is positioned above the top of the pivot bin and
covers a maintenance area above the top of the pivot bin outboard of the valance; and
a keep-out assembly, coupled to the mounting surface of the strongback,
wherein
the keep-out assembly comprises:
a keep-out lens that is pellucid, and
a keep-out mounting bracket supporting the keep-out lens,
the keep-out mounting bracket comprises a base, mounted to the strongback above the top of the pivot bin,
the keep-out mounting bracket is positioned outboard of the valance,
the keep-out mounting bracket further comprises a support arm, extending from the base,
the support arm supports the keep-out lens at an elevated position above the strongback such that a pocket is formed between the keep-out lens and the strongback, and
the pocket is located outboard of the valance.

15. The stowage bin assembly of claim 14, wherein the support arm holds the keep-out lens at a non-horizontal orientation and at a non-vertical orientation.

16. The stowage bin assembly of claim 14, wherein:
the valance comprises a top edge,
the keep-out-lens comprises an inner edge, and
the support arm holds the inner edge of the keep-out lens adjacent the top edge of the valance to close off the pocket outboard of the valance.

17. The stowage bin assembly of claim 14, further comprising
a light assembly, comprising a light and a light mounting bracket, holding the light, wherein
the light mounting bracket is mounted to the mounting surface of the strongback,
the base comprises a tab, mounted to the light mounting bracket, and
the support arm supports the keep-out lens above the light of the light assembly such that the light is located in the pocket.

18. A method of closing out a maintenance area using a keep-out assembly, wherein the maintenance area is located above a top of a stowage bin assembly of a vehicle, wherein the maintenance area is formed by a valance at an inboard position along the stowage bin assembly at the top of the stowage bin assembly, wherein the keep-out assembly comprises a keep-out lens that is pellucid, wherein the keep-out assembly further comprises a mounting bracket, supporting the keep-out lens, and wherein the mounting bracket comprises a base and a support arm, extending from the base, the method comprising steps of:
coupling the base of the keep-out mounting bracket to the top of the stowage bin assembly outboard of the valance in the maintenance area, wherein the base is coupled to the stowage bin assembly such that the support arm extends from the base away from the stowage bin assembly to an elevated position above the maintenance area; and
removably securing the keep-out lens to the support arm to form a pocket between the keep-out lens and the stowage bin assembly,
wherein
the pocket defines the maintenance area, and
the keep-out lens closes off the maintenance area from above, and the keep-out lens allowing enables the maintenance area to be visible through the keep-out lens.

19. The method of claim 18, wherein the keep-out lens comprises an inner edge and an outer edge, the method further comprising
positioning the keep-out lens such that the inner edge of the keep-out lens is adjacent the valance, and the outer edge of the keep-out lens is adjacent a strongback of the stowage bin assembly to define the maintenance area under the keep-out lens, inboard of the valance, and above the strongback.

20. The method of claim 18, wherein:
the stowage bin assembly further comprises a light assembly, comprising a light and a light mounting bracket, holding the light, the light assembly is received in the maintenance area and is mounted to the top of the stowage bin assembly, the step of coupling the base of the keep-out mounting bracket to the top of the stowage bin assembly further comprises coupling the base of the keep-out mounting bracket to the light mounting bracket mounted to the top of the stowage bin assembly, and the step of removably securing the keep-out lens to the support arm comprises positioning the keep-out lens above the light such that electromagnetic-energy waves from the light pass through the keep-out lens.

\* \* \* \* \*